(12) United States Patent
Haran

(10) Patent No.: US 8,670,661 B2
(45) Date of Patent: Mar. 11, 2014

(54) METHOD AND SYSTEM FOR PASSIVE OPTICAL NETWORK DIAGNOSTICS

(75) Inventor: Onn Haran, Even Yehuda (IL)

(73) Assignee: PMC-Sierra Israel Ltd., Herzeliya Pituach (IL)

( * ) Notice: Subject to any disclaimer, the term of this patent is extended or adjusted under 35 U.S.C. 154(b) by 1790 days.

(21) Appl. No.: 11/564,299

(22) Filed: Nov. 29, 2006

(65) Prior Publication Data

US 2007/0140689 A1 Jun. 21, 2007

Related U.S. Application Data

(60) Provisional application No. 60/699,879, filed on Jul. 18, 2005.

(51) Int. Cl.
*H04B 10/075* (2013.01)

(52) U.S. Cl.
USPC ............................................. 398/17

(58) Field of Classification Search
CPC ........... H04B 10/077; H04B 10/07953; H04B 10/0799; H04Q 11/0066; H04Q 2011/0079; H04L 43/0847; H04L 43/16
USPC ........................................ 398/17, 22, 28, 38
See application file for complete search history.

(56) References Cited

U.S. PATENT DOCUMENTS

| | | | |
|---|---|---|---|
| 6,546,014 B1 * | 4/2003 | Kramer et al. | 370/395.41 |
| 7,146,099 B2 * | 12/2006 | Kamalov et al. | 398/26 |
| 7,230,926 B2 * | 6/2007 | Sutherland et al. | 370/241 |
| 7,242,868 B2 * | 7/2007 | Soto et al. | 398/72 |
| 7,301,968 B2 | 11/2007 | Haran et al. | |
| 7,428,382 B2 * | 9/2008 | Soto et al. | 398/20 |
| 2002/0085583 A1 * | 7/2002 | Kasa et al. | 370/449 |
| 2002/0196801 A1 | 12/2002 | Haran et al. | |
| 2003/0133460 A1 | 7/2003 | Lee et al. | |
| 2004/0247316 A1 | 12/2004 | Soto et al. | |
| 2005/0019031 A1 | 1/2005 | Ye et al. | |
| 2007/0140689 A1 | 6/2007 | Haran | |

OTHER PUBLICATIONS

Intersil BBT3420, Quad 2.488-3.1875 Gbps/Channel Transceiver, Data Sheet, Sep. 14, 2005.*
Data sheet of SMS6000 by Soft Mixed Signal Corp., 2003.*
802.3™ "Part 3: *Carrier sense multiple access with collision detection (CSMA/CD) access method and physical layer specifications*" IEEE Computer Society. Dec. 2005.
"*Part 3: Carrier sense multiple access with collision detection (CSMA/CD) access method and physical layer specifications*" Section Two IEEE Computer Society. Dec. 2005.

(Continued)

*Primary Examiner* — Shi K Li
(74) *Attorney, Agent, or Firm* — Mark M. Friedman

(57) ABSTRACT

A method and system for identifying faults in a passive optical network (PON). The method comprises acquiring at an optical network terminal of the PON at least one parameter indicative of at least one malfunction in at least one optical network unit of the PON, and identifying each malfunction from the at least one parameter. The parameters measured include, for each ONU, laser power, sync-lock and -unlock time and bit error rates. The information at the OLT is acquired remotely and in digital form, without use of any physical probing of any point or element in the PON. The system includes a temporal measurement module and a power laser measurement module coupled to a central processing unit that can extract fault information from digital data processed in the two modules.

17 Claims, 6 Drawing Sheets

(56) References Cited

OTHER PUBLICATIONS

"*Part 3: Carrier sense multiple access with collision detection (CSMA/CD) access method and physical layer specifications*" Section Three IEEE Computer Society Dec. 2005.

"*Part 3: Carrier sense multiple access with collision detection (CSMA/CD) access method and physical layer specifications*" Section Four IEEE Computer Society Dec. 2005.

"*Part 3: Carrier sense multiple access with collision detection (CSMA/CD) access method and physical layer specifications*" Section Five. IEEE Computer Society. Dec. 2005.

\* cited by examiner

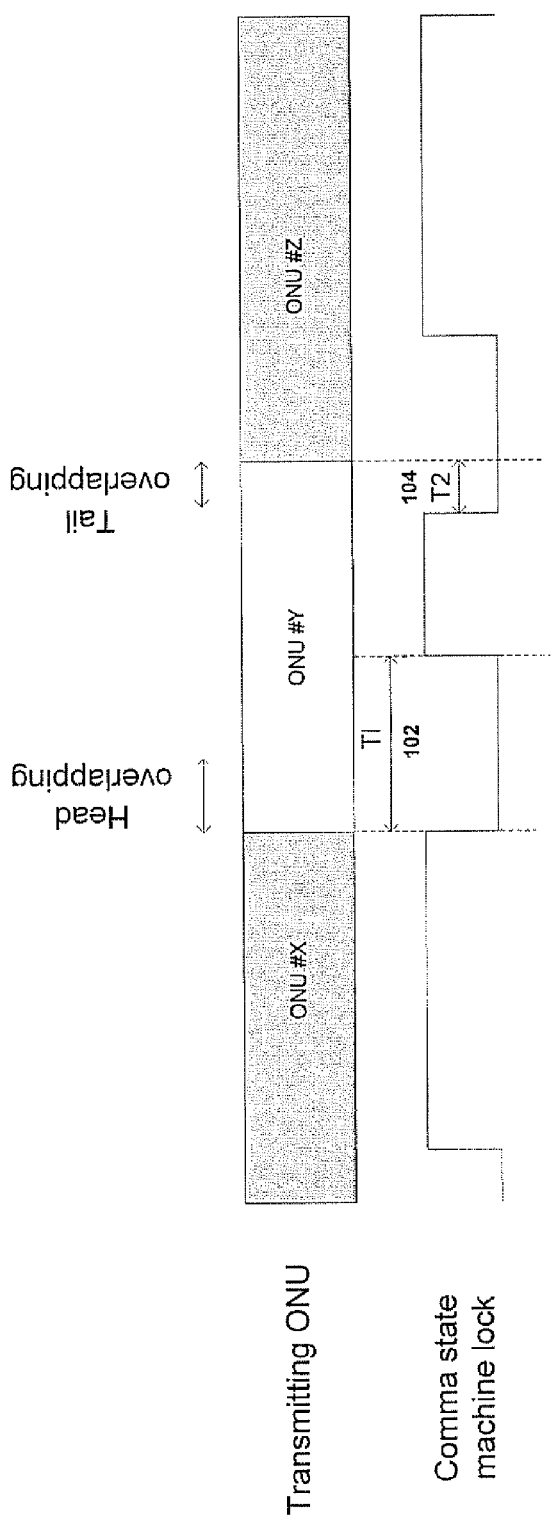
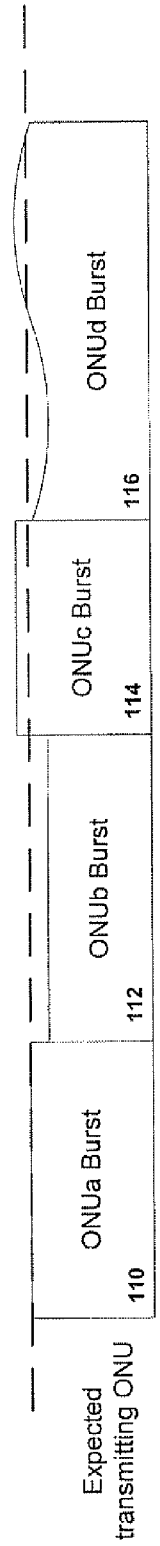
Figure 1A
Figure 1B

METHOD AND SYSTEM FOR PASSIVE OPTICAL NETWORK DIAGNOSTICS

This patent application claims the benefit of PCT Patent Application No. PCT/IL05/001358, filed Dec. 19, 2005, which claims the benefit of U.S. Patent Application No. 60/699,879 filed Jul. 18, 2005.

FIELD OF THE INVENTION

The present invention relates generally to passive optical networks (PON) and more particularly to active real time monitoring of such networks

BACKGROUND OF THE INVENTION

Passive optical networks, and in particular Ethernet PONs (EPONs) are known, and described for example in U.S. Patent Application No. 20020196801 by Haran et al. The debugging of a running/active network in a shared media network environment is difficult. At the same time, the ability to proactively monitor the network and to verify that its behavior is correct is valuable. Isolating transmission errors (or simply "errors"), detecting the cause of an error and providing debugging tools are highly desired features in a network environment.

A major goal in a PON that comprises an optical line terminal (OLT) and a plurality of optical network units (ONUs) is to detect degradation in the network behavior before customer complains, namely before errors are evident on the line. The most critical aspect is fault isolation, i.e. finding a faulty ONU before it harms the performance of other ONUs. The specific fault of the ONU is less important, because the faulty ONU is likely to be replaced by the network operator.

A PON may suffer from one or mote of a number of failure modes (malfunctions or problems), either time-related ("temporal) or laser-power related ("power"), as shown respectively in FIGS. 1A and 1B. FIG. 1A shows potential temporal malfunctions in a PON comprising 3 ONUs X, Y and Z. In FIG. 1A, the transmission pattern includes two collision zones, a zone 102 between ONU X and ONU Y and a zone 104 between ONU Y and ONU Z. Zone, 102 represents a case in which either ONU X stopped transmission after its expected stop time, or ONU Y began transmission after its expected start time. Zone 104 represents a case in which either ONU Y stopped transmission before its expected stop time, or ONU Z started transmission before its expected start time. T1 is the time needed to reach the "sync-lock" or "gain" state of the grant to ONU Y (grant Y), this time also referred to herein as "sync-lock time". T2 is the time needed to reach the end of grant Y and of the "sync-unlock" or "loss" state (also referred to herein as "sync-unlock time"), "Head overlapping" and "Tail overlapping" refer to heads and tails of grant Y and their overlap with, respectively, a previous and a following grant. In effect, these illustrate the temporal malfunctions of early or late burst reception and early or late end of burst, explained in more detail below.

Early burst reception refers to the case in which an ONU turns-on its laser before the expected time. The outcome may be a bit error rate (BER) in the grant to an ONU immediately preceding the suspected ONU.

Late burst reception refers to the opposite of early burst reception, the reasons being similar. The outcome may be a BER detected in the transmission of the suspected ONU.

Early end of burst refers to the case in which an ONU turns off its laser before the expected time. The outcome could be a BER at the end of its grant. The reasons for an early end of burst may be a faulty ONU or bad ONU timing.

Late end of burst refers to the opposite of early end of burst. The reasons are similar. In this case, the outcome may be a BER at the grant start of the next ONU.

FIG. 1B shows the power transmission pattern of several ONUs a, b, c and d and illustrates potential laser power malfunctions in a PON. The figure shows a normal laser power signal ("ONU burst") 110 for ONUa as well as three possible power level malfunctions: a weak laser signal 112 for ONUb, a strong laser signal 114 for ONUc and an unstable laser signal 116 for ONUd, all explained in more detail below:

Weak laser signal refers to a failure in which the strength of the ONU signal is lower than expected. This can result from an increase in attenuation or degradation in the ONU's laser power.

Strong laser signal refers to a failure in which the strength of the ONU laser signal is higher than expected. This can result from a faulty operation of the ONU's laser power control.

Unstable laser signal refers to the laser power of a specific ONU being unstable and having random patterns.

A fourth power malfunction is defined as "Laser stuck at 1", which refers to the situation in which an ONU does not turn off its laser. The laser can transmit random data, idles, or "1"s, with the most likely events being idles and data. This malfunction can have a high impact on the network operation. It also has no specific characterization measurement and its existence is deduced from the behavior of the system.

At present, there are no known methods to detect these malfunctions/problems without intrusive access to the fiber infrastructure and without testing a suspected ONU component in a lab. It would therefore be advantageous to have methods and systems for active real time monitoring (diagnostics) of a PON, which provide information on various failure modes. Preferably, this monitoring should be done without placing any physical equipment at test points of the PON.

SUMMARY OF THE INVENTION

The present invention discloses a system and method for detecting and isolating problems and malfunctions in a PON without placing any physical test equipment anywhere. The system, centered on the OLT, is also referred to as an "OLT diagnostic system". In some cases, a malfunction comes into play when errors are detected. In other cases, a measurement can alert a PON operator to a problem before there are errors. For example, a too weak (low) optical power level may work without any problem, but the carrier would be alerted and can send a technician to handle the problem before a subscriber call. Subscriber calls and downtime are very costly to the operator, and any reduction in these decreases the operational expenses (OPEX) of the carrier, providing the carrier with a major benefit.

According to the present invention there is provided a method for identifying faults in a PON, the method comprising the steps of: at the OLT, acquiring at least one parameter indicative of at least one malfunction in at least one of the ONUs, and identifying each malfunction from the at least one parameter.

According to one feature of the method of the present invention, the at least one malfunction includes at least one malfunction selected from the group consisting of a temporal malfunction and a laser-power malfunction, and the step of acquiring at least one parameter includes acquiring at least one parameter in digital form.

According to another feature of the method of the present invention, the step of acquiring at least one parameter in digital form includes acquiring for each ONU at least one BER parameter.

According to yet another feature of the method of the present invention, the step of acquiring at least one BER parameter includes acquiring a BER parameter indicative of an error, and the step of identifying includes performing an error isolation procedure.

According to yet another feature of the method of the present invention, the step of acquiring at least one BER parameter includes acquiring a BER parameter not indicative of an error, and the step of acquiring further includes acquiring a parameter selected from the group consisting of a sync-lock time value and a sync-unlock time value.

According to yet another feature of the method of the present invention, the temporal malfunction is selected from the group consisting of an early burst reception and a late burst reception, the acquiring includes acquiring the sync-lock time value and the step of identifying further includes comparing the acquired sync-lock time value with a known value, whereby the comparison identifies the temporal malfunction.

According to yet another feature of the method of the present invention, the at least one temporal malfunction is selected from the group consisting of an early end of burst and a late end of burst, the acquiring includes acquiring the sync-unlock time value and the step of identifying further includes comparing the acquired sync-unlock time value with a known value, whereby the comparison identifies the temporal malfunction.

According to yet another feature of the method of the present invention, the laser-power malfunction is selected from the group consisting of a weak laser signal and a strong laser signal, the step of acquiring at least one parameter in digital form includes acquiring for each ONU at least one laser power value during a respective grant, and the step of identifying includes comparing the measured laser power value with a known power value, whereby the comparison identifies the laser-power malfunction.

According to yet another feature of the method of the present invention, the laser-power malfunction includes an unstable laser power signal, the step of acquiring at least one parameter in digital form includes acquiring for each ONU measuring the transmission power of each ONU during several grant transmissions, and the step of identifying includes comparing a deviation of these measurements with a configurable measurement.

According to the present invention there is provided a method for identifying faults in a PON, the method comprising the steps of: at the OLT, obtaining at least one of temporal and laser power data from each ONU, and identifying a malfunctioning ONU from the at least one of temporal and laser power data.

According to one feature of the method of the present invention, the step of obtaining temporal and laser power data includes obtaining, for each ONU, transmission error data.

According to another feature of the method of the present invention, the obtaining for each ONU transmission error data includes obtaining at least one parameter selected from the group consisting of a bit error rate, a sync-lock time, a sync-unlock time and a laser-power parameter.

According to yet another feature of the method of the present invention, the step of identifying a malfunctioning ONU includes identifying, for a given ONU, a malfunction selected from the group consisting of early burst reception, late burst reception, early end of burst, late end of burst, weak laser signal, strong laser signal, unstable laser signal and laser stuck at 1.

According to the present invention there is provided a system for identifying faults in a passive optical network comprising: a timing measurement module coupled to the OLT and operative to provide at least one temporal parameter for each GNU from a comma sync data stream, a laser power measurement module coupled to the OLT and operative to provide at least one laser power parameter for each ONU and a central processing unit operative to extract an ONU status indicative of a fault based on at least one parameter selected from the group consisting of the at least one temporal parameter, the at least one laser power parameter, and a combination thereof.

According to one feature of the system of the present invention, the system further comprises a BER measurement module operative to periodically sample transmission errors for each ONU from a BER detection data stream.

According to another feature of the system of the present invention, the system further comprises a grant monitor unit coupled and operative to notify the timing measurement, laser power measurement and BER measurement modules of an expected granted ONU.

According to yet another feature of the system of the present invention, the system further comprises a MAC unit used to detect code errors in an incoming data stream and to provide the BER detection data stream to the BER measurement module and the comma sync data stream to the timing measurement module.

According to yet another feature of the system of the present invention, the at least one temporal parameter includes a parameter selected from the group of sync-lock time and sync-unlock time.

According to yet another feature of the system of the present invention, the laser power measurement module is coupled to and operative to receive a digital laser power signal from an analog laser power measurement subsystem.

According to yet another feature of the system of the present invention, the incoming data stream is an optical data stream provided by an optical transceiver.

These and further embodiments will be apparent from the detailed description and examples that follow.

BRIEF DESCRIPTION OF THE DRAWINGS

For a better understanding of the present invention and to show more clearly how it could be applied, reference will now be made, by way of example only, to the accompanying drawings in which:

FIG. 1A shows a transmission timing diagram of several ONUs;

FIG. 1B shows a transmission power level diagram of several ONUs;

DETAILED DESCRIPTION OF THE INVENTION

Figure 3:
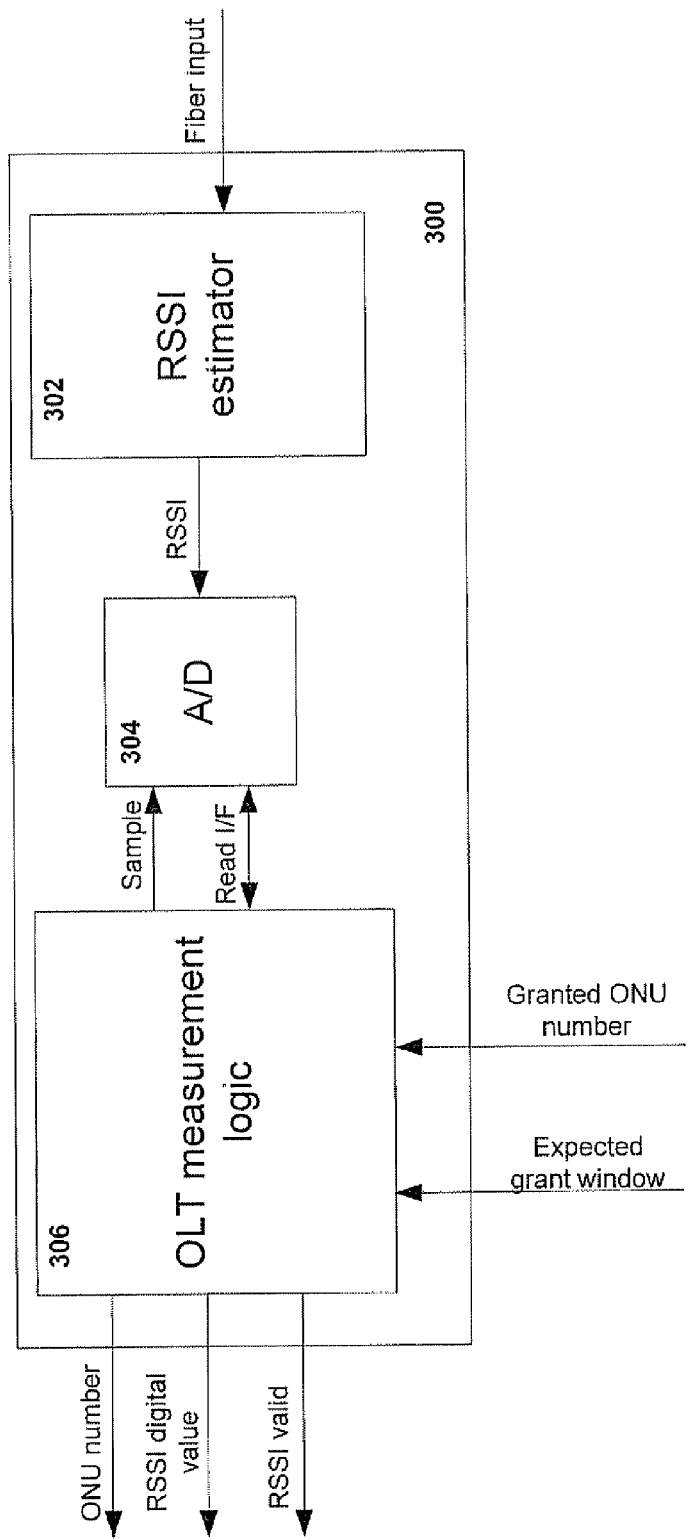
FIG. 3 shows a Receive Signal Strength Indication (RSSI) measurement subsystem.

The present invention discloses a PON diagnostics system and method that provide an operator with the ability to identify and isolate problems in teal time in a PON. The system includes software (SW) that can analyze the collected results and provide information about existing or potential malfunctions/problems. The diagnostics method provides to an operator one or more of the following parameters:

"Laser power", presented per ONU and measured with the subsystem of FIG. 3.

Figure 4:
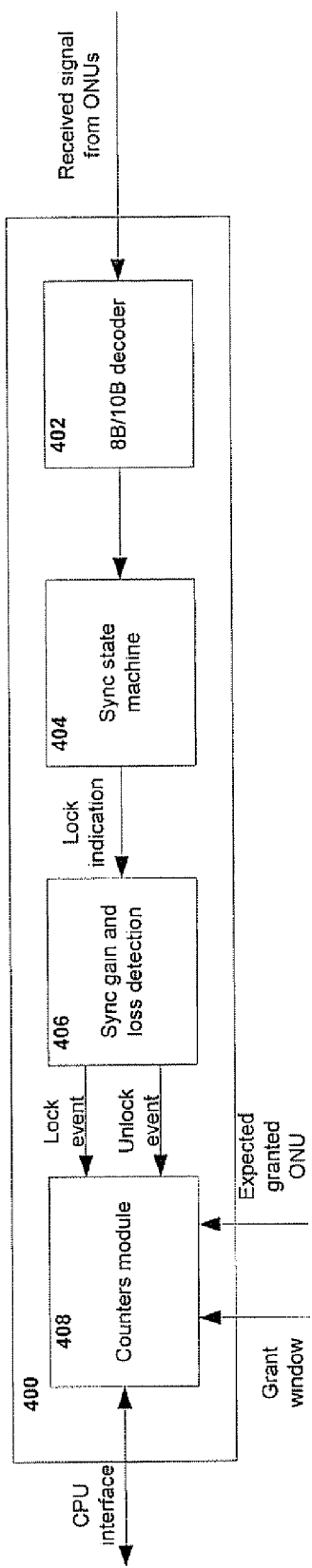
FIG. 4 shows a timing measurement subsystem.

"Sync-lock and -unlock time", i.e. the actual time the ONU starts and ends its transmission relative to an expected time, measured with the subsystem of FIG. 4.

"Bit error", included in the IEEE802.3ah standard and presented per ONU on a time scale from grant start or grant end.

The type of malfunction is identified, per ONU or group of ONUs, from an analysis of one parameter or a combination of these parameters.

The bit error rate for each ONU is sampled periodically. If there are errors (in terms of BER), then further measurements (BER, sync-lock and -unlock time and/or laser power) are made, also periodically. These measurements follow one (or both) of two scenarios: "Scenario 1", used if no more errors are detected and "Scenario 2", used after further errors are detected Scenario 1 is a simple go/no-go scenario.

Figure 2:
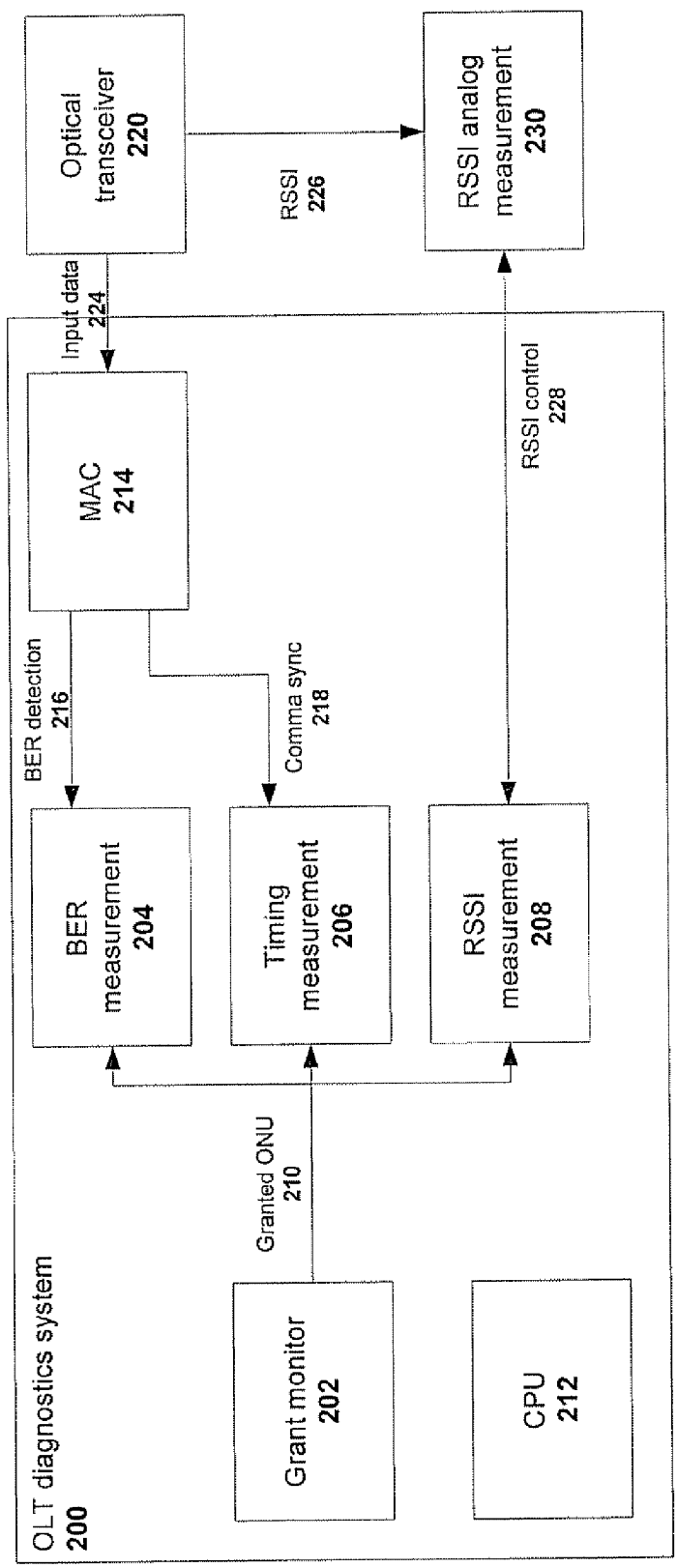
FIG. 2 shows an OLT diagnostic system of the present invention.

FIG. 2 shows an OLT diagnostic system 200 of the present invention. The system is operative to perform diagnostics of each ONU through both temporal measurements and laser power measurements. The laser power measurements are performed using a subsystem 300 shown in FIG. 3. The temporal (timing) measurements are performed using a subsystem 400 shown in FIG. 4. System 200 comprises subsystems 300 and 400.

In more detail, system 200 comprises a grant monitor 202; a BER measurement module 204 operative to perform transmission error measurements from received BER data 216; a timing measurement module 206 (identical with subsystem 400) operative to perform sync-lock and -unlock measurements based on comma sync data received in a stream 218; and a Receive Signal Strength Indication (RSSI=laser power) measurement module 208 operative to perform laser power measurements. Grant monitor 202 is coupled to all three modules 204, 206, and 208 and operative to notify them of the expected granted ONU through notifications 210. System 200 further comprises a central processing unit (CPU) 212 coupled to all modules/units and used for running the algorithms (scenarios) described in more detail below. CPU 212 acts essentially as a logic device operative to extract an ONU status indicative of a fault based on at least one temporal parameter (sync-lock or unlock time), laser power parameter or a combination thereof. System 200 further comprises a media access control (MAC) unit 214 used to detect code errors in an incoming data stream 224. MAC unit 214 provides a BER detection data stream to module 204 and the comma sync data stream 218 to module 206.

System 200 is coupled to an optical transceiver 220 and to an RSSI analog measurement subsystem 230. The connection to subsystem 230 is through an RSSI control interface 228. Transceiver 220 is operative to receive optical signals from each ONU and to provide data stream 224 to MAC 214 and a RSSI analog data stream 226 to subsystem 230. Subsystem 230 comprises an analog-to-digital (A/D) converter ("ADC", see also ADC 304 in FIG. 3) and a RSSI sampling element (not shown). Data 224 is converted to digital signals before its input to the MAC unit. RSSI analog data stream 226 is converted to a digital data stream by ADC 304 in module 230. RSSI control interface 228 also controls the RSSI sampling element.

FIG. 3 shows in more detail RSSI measurement subsystem 300. System 300 comprises a RSSI estimator module 302 operative to receive a data input ("Fiber input"), and to output an analog RSSI (laser power) signal; an ADC 304 operative to hold the RSSI signal stable during the time the analog value is converted to a digital RSSI value; and an OLT measurement logic 306 that resides in the OLT and is operative to provide "sample" inputs to the ADC and to receive the digital RSSI value from ADC 304 at a programmable time from grant start through a digital interface Read I/F (typically 12C). Logic 306 is further operative to track the expected transmission of the ONUs, indicating which ONU is expected to transmit and when. In essence, logic 306 comprises grant monitor 202 plus a timing element (not shown) that controls the relative timing of the sample within the grant. The results are provided with a validity indication ("RSSI valid"), and the number of the GNU for which the measurement was taken ("ONU number"). Logic 306 is controlled by SW in the OLT (not shown), which processes the received RSSI value. The RSSI value is stored per ONU, and allows the SW to do the processing mentioned below. Note that subsystem 300 essentially includes elements 208, 220, and parts of module 230 in FIG. 2.

To clarify, subsystem 300 is used to measure the "laser power" parameter. The measurement samples the transmission from the ONU at a programmable time from grant start RSSI is measured during the grant. Several measurements can be collected and averaged. The values are analyzed by the SW by comparison with absolute allowed values or with previous values measured for the specific ONU. The determination of the measurement point is performed using a sample-and-hold mechanism (not shown) inside A/D converter 304.

FIG. 4 shows in more detail timing measurement subsystem 400 comprising a 8B/10B decoder 402, a sync state machine 404, a sync gain/loss (lock/unlock) detection unit 406 and a counters module 408. Serial comma sync data stream 218 (FIG. 2) received from the ONUs is aligned by 8B/10B decoder 402, which is responsible for finding the correct phase of the serial stream based on the existence of a comma code word. Sync state machine 404 then searches for the number of repetitions as defined by the IEEE802.3 standard (currently three consecutive comma code-words) and outputs a lock indication signal. Detection unit 406 detects any chance in the level of the lock indication signal, moving from lock to unlock and vice-versa. The counters module includes a counter to count the time since expected grant time (lock time) and another counter for measuring the unlock time from end of grant.

"Lock event" and "unlock event" refer to respective pulses during the event of the change. A SW database (not shown) stores the relative time of attaining the sync-lock event, measured from the start of a grant, and the relative time of the sync-unlock event measured from the end of a grant, per each ONU A "grant window" input is used to measure each event relative to the expected grant, and an "expected granted ONU" input is used later to identify the ONU on which the measurement was taken, and use the ONU index to store the measurement in the correct entry of the database. A "CPL interface" is used for accessing the database.

It will be apparent to one skilled in the art that some of the modules/functions described above can be implemented in hardware, some in software and some in combinations of hardware and software.

In summary, the subsystem of FIG. 4 is used to measure the sync-lock (as well as the sync-unlock) time for each ONU. The value of the sync-lock time can be used as pass/fail decision. The specific measurement(s) to detect each type of malfunction and their analysis is (are) now described in more detail Early Burst Reception There are two measurements performed to detect this malfunction. Their order is interchangeable.

Scenario 1: Measurement of the sync-lock time of each ONU. The result of each measurement is compared with a predetermined value and a previous value a value stored in the SW database (both values referred to henceforth as "known" values). If the measured sync-lock time value is smaller than the known value over several measurements, an alarm is raised in SW. Several methods of raising alarms are known in the art and may be employed for the purposes set forth herein.

Scenario 2: Measurement of transmission errors (BER) during the transmission of each is ONU. When transmission errors are detected for an ONU (e.g. ONU N), the time until the next granted ONU (also referred to herein as "distance to next grant"), is increased by the OLT. The distance increase represents an increase in the gaps between timeslots allotted to two consecutively transmitting ONUs. If errors are not detected anymore for the same ONU N, then the ONU granted following ONU N is suffering from a too early burst reception. In essence, the fault detection is done by checking ONU N, with the deduction being that the faulty ONU is the ONU granted immediately following ONU N.

Late Burst Reception

The same two measurements serving early burst reception are also used in late burst reception:

Scenario 1: As above, measurement of the sync-lock time of each ONU and comparison with a known value. If the measured sync-lock time value is larger than the known value over several measurements, an alarm is raised in SW.

Scenario 2: Measurement of the transmission errors during the transmission of each ONU. When transmission errors are detected in ONU N, the distance to the next grant is increased. If errors are still detected, the distance from an immediately preceding grant is increased. If errors are still detected, then the problem resides in ONU N, which suffers from either late burst reception or early end termination. Differentiation between these problems is not required, since the faulty ONU module needs to be replaced in both cases.

Early End of Burst

There are two measurements to detect this malfunction:
1. Measuring the sync-unlock time.
2. Measuring the BER that exists during the transmission of each ONU.

As before, there are two scenarios.

Scenario 1: Measurement of the sync-unlock time of each ONU and comparison with a known value. If the currently measured value indicates an earlier sync-unlock time for several measurements than the known stored predetermined/previously measured value, an alarm is raised.

Scenario 2: Measurement of the transmission errors during the transmission of each ONU. The transmission of the probed ONU for which errors were detected (identified from the BER measurement) is set apart from that of other ONUs. If the probed ONU transmission errors persist and the power level seems to be as needed, then the probed ONU should be replaced as it suffers from either early end of burst or late start of burst, see below.

Late End of Burst

The same measurements serving to detect an early end of burst are also used in a late end of burst malfunction.

Scenario 1: As above, measurement of the sync-unlock time of each ONU and comparison with a known value. If the currently measured value indicates a later sync-unlock time for several measurements than the stored predetermined/previously measured value an alarm is raised.

Scenario 2: If transmission errors are detected at ONU N, the scheduled transmission of the following ONU is delayed. If errors persist at ONU N, the scheduled transmission of the following ONU is delayed from that of the previous ONU. If the errors disappear, then the ONU granted before ONU N is faulty Weak Laser Signal There are two measurements to detect this malfunction:
1. Measuring the laser power during a grant and detecting a low result.
2. Measuring the overall BER and obtaining a high BER.

Scenario 1: A database (not shown) connected to OLT measurement logic 306 holds the power level transmitted from each ONU. If the results received during several power measurements are lower than a minimal configurable threshold or a previous result (referred to henceforth as a "known minimal power value"), an alarm is raised.

Scenario 2 kicks in if the transmission errors of any ONU were above the minimal configurable threshold and/or the previous result. The grant of the probed ONU, for which errors were detected, is kept apart from other grants. If errors are still observed, then the laser power of each ONU is measured. If the power is low only for the specific (probed) ONU, then the specific fiber drop connected to the probed ONU needs to be checked and the ONU may need to be replaced. If several ONUs are suffering from low power, then this indicates an infrastructure problem, which can be identified based on the ONUs sharing the same fiber leafs.

Strong Laser Signal

The same measurements serving to detect a weak laser signal are also used in a strong laser signal malfunction.

Scenario 1 uses the same database described above that holds the power level transmitted from each ONU. If the laser power results received during several measurements are higher than a maximal configurable threshold or a previous result (referred to henceforth as a "known maximal power value"), an alarm is raised.

Scenario 2 is identical with scenario 2 of a weak laser signal, except that the checking is done for a high power value of an ONU.

Laser Stuck at 1

There are three measurements to detect this malfunction, and all three need to be evaluated together:
1. Measuring which ONUs are logically connected, as indicated from the ONU registration state machine. When all ONUs are disconnected due to an "interrupting," ONU, only a single, "suspicious" ONU is still connected.
2. Measuring the BER and discovering a high BER—the other ONUs will suffer from BER distributed randomly throughout the grant.
3. Measuring the laser signal at the time signal should have no power—the result would be higher than expected.

Unstable Laser Signal

There is one measurement to detect this malfunction: measuring the transmission power of an ONU during several grant transmissions, and comparing a deviation of these measurements with a configurable power level. If the deviation exceeds an allowed value, an alarm is raised, see item 208 in FIG. 2.

Figure 5:
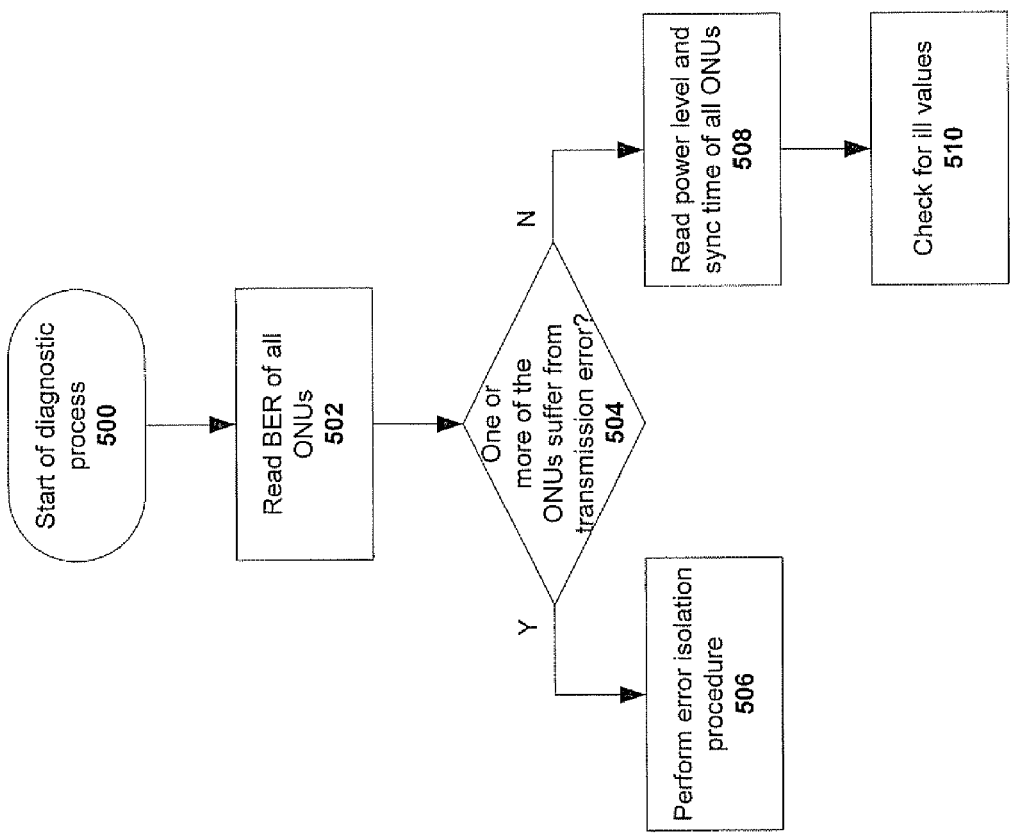
FIG. 5 shows major steps of a process for fault isolation of the present invention.

FIG. 5 shows major steps of the method for detecting and isolating problems and malfunctions in a PON according to the present invention. The diagnostic process starts in step 500, where a periodical timer triggers periodic checks. The transmission errors of all ONUs are read in step 502. If, based on the BER, one or more ONUs are found to suffer from transmission errors, the system performs a transmission error isolation procedure in step 506. If none of the ONUs suffer from transmission errors, the power level and sync time of each ONU is read in step 508, and all "bad" ("ill"), values are checked in step 510 in order to notify the system of a potential fault.

Figure 6:
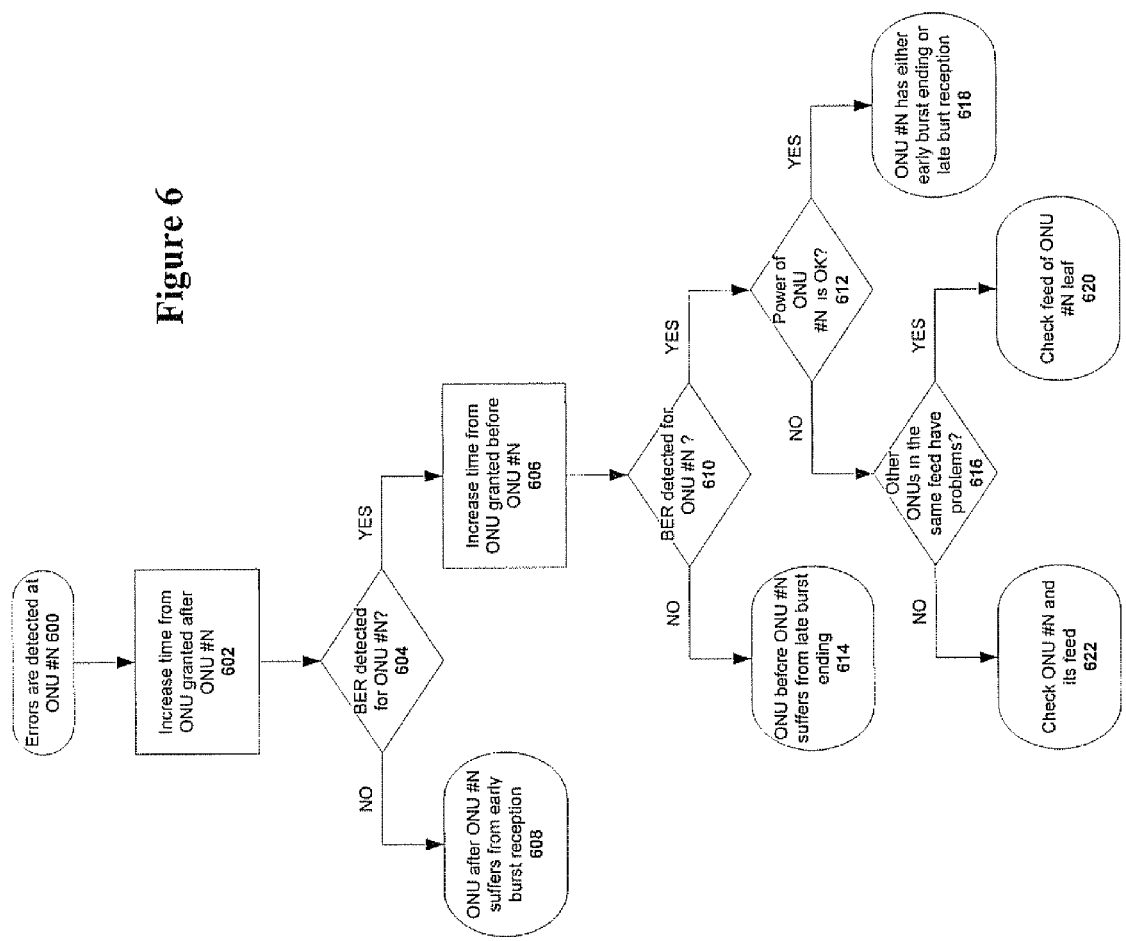
FIG. 6 shows a detailed example for the process of fault isolation of the present invention.

The flow diagram in FIG. 6 presents a detailed exemplary fault isolation procedure (details of step 506). The operation begins after transmission errors are detected in step 600 (equivalent to step 504 in FIG. 5) for ONU N. The first action taken in step 602 is to increase the "time to grant" until the ONU after ONU N is granted. In step 604, a check is made again for errors in ONU N. If the transmission errors disappear, ONU N is not faulty, but the ONU granted after ONU N is. The operation moves to step 608, where an alarm is raised for the faulty ONU as suffering from an early burst reception. If the errors persist in ONU N, the operation resumes from step 606, where the time to grant from the ONU granted before ONU N is increased. Errors are rechecked in step 610 for ONU N. If the errors stop, then the operation completes in step 614, where an alarm is raised for the ONU granted before ONU N as suffering from a late end of bursts. If the errors persist in step 610, the power level of ONU N is checked in step 612. If the power level is good, the operation completes in step 618 with an alarm raised for ONU N for a timing problem. If the power level is not good, execution continues from step 616. The performance of other ONUs in the same leaf is checked starting from step 612. If any of those ONUs suffer from errors, then all the leaf is tested in step 620. If only ONU N experiences problems, then ONU N and its feed are checked physically (egg by a technician) in step 622.

Note that the flow in FIG. 6 is for illustrative purposes only, and that the order of some steps may be changed and reversed. For example, the order of the checks can be swapped, i.e. instead of separating the grants in the time domain so that the OLT first giants the ONU before the one with transmission errors, the OLT can first grant the ONU after the ONU with transmission errors.

All patent applications mentioned in this specification are herein incorporated in their entirety by reference into the specification, to the same extent as if each individual patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

What is claimed is:

1. A method for identifying a malfunction in a PON which includes a central OLT and a plurality of ONUs, the method comprising the steps of: at the OLT, for each ONU:
   (a) measuring a sync-lock time and a bit rate during each of a plurality of grant periods of a specific ONU, wherein the measurements are performed in real time;
   (b) comparing each of said measured sync-lock time and said measured bit error rate with a respective reference value to obtain a comparison result, wherein said reference value for said measured sync-lock time includes a known value of said sync lock time; and
   (c) identifying a malfunction, selected from the group consisting of an early burst reception and a late burst reception, based on the comparison result.

2. The method of claim 1, further comprising the steps of:
   (d) measuring a transmitter laser power of the specific ONU; and
   (e) comparing said measured transmitter laser power to a reference value includes a known laser power value.

3. The method of claim 2, further comprising the step of:
   (f) identifying an unstable laser signal.

4. The method of claim 2, further comprising the step of:
   (f) identifying a malfunction selected from the group consisting of a weak laser signal and a strong laser signal.

5. The method of claim 2, further including the step of:
   (f) determining whether the specific ONU is logically connected.

6. The method of claim 5, further comprising the step of:
   (g) identifying a laser stuck at 1.

7. A system for identifying faults in a PON which includes an OLT and a plurality of ONUs, the system comprising:
   (a) a timing measurement module coupled to the OLT and operative to provide a measured sync-lock time for each ONU from a comma sync data stream;
   (b) a BER measurement module operative to periodically sample transmission errors for each ONU from a BER detection data stream, thereby providing a measured BER; and
   (c) a central processing unit to extract an ONU status indicative of a fault selected from the group consisting of an early burst reception and a late burst reception based on a comparison of each of said measured sync-lock time and said measured BER with a respective reference value thereof;
   wherein said reference value for said sync-lock time includes a known value of said sync-lock time.

8. The system of claim 7, further comprising a grant monitor unit coupled and operative to notify the timing measurement and BER measurement modules of an expected granted ONU.

9. The system of claim 8, further comprising a MAC unit used to detect code errors in an incoming data stream and to provide the BER detection data stream to the BER measurement module and the comma sync data stream to the timing measurement module.

10. The system of claim 9, wherein the incoming data stream is an optical data stream provided by an optical transceiver.

11. The system of claim 7, wherein said timing measurement module is operative to provide, during a respective plurality of grant periods, a respective plurality of values of said measured sync-lock time.

12. The system of claim 7, further comprising:
   (d) a logic module operative to track the expected transmissions of each ONU and including a grant monitor operative to notify the timing measurement module of an expected granted ONU.

13. The system of claim 7, further comprising:
   (d) a laser power measurement module coupled to the OLT and operative to provide at least one laser power parameter for each ONU.

14. The system of claim 13, wherein the laser power measurement module is coupled to and operative to receive a digital laser power signal from an analog laser.

15. The system of claim 13, wherein said laser power measurement module is operative to provide, during a plurality of grant periods for each ONU, a respective plurality of values of said at least one laser power parameter.

16. A method for identifying a malfunction in a PON which includes a central OLT and a plurality of ONUs, the method comprising the steps of: at the OLT, for each ONU:

(a) measuring a sync-unlock time and a bit rate during each of a plurality of grant periods of a specific ONU, wherein the measurements are performed in real time;
(b) comparing each of said measured sync-unlock time and said measured bit error rate with a respective reference value to obtain a comparison result, wherein said reference value for said measured sync-unlock time includes a known value of said sync-unlock time; and
(c) identifying a malfunction, selected from the group consisting of an early end of burst and a late end of burst, based on the comparison result.

17. A system for identifying faults in a PON which includes an OLT and a plurality of ONUs, the system comprising:
(a) a timing measurement module coupled to the OLT and operative to provide a measured comma sync-unlock time for each ONU;
(b) a BER measurement module operative to periodically sample transmission errors for each ONU from a BER detection data stream, thereby providing a measured BER; and
(c) a central processing unit to extract an ONU status indicative of a fault selected from the group consisting of an early end of burst and a late end of burst based on a comparison of each of said measured sync-unlock time and said measured BER with a respective reference value thereof;
wherein said reference value for said sync-unlock time includes a known value of said sync-unlock time.

* * * * *